United States Patent [19]

Murray

[11] 4,352,900

[45] Oct. 5, 1982

[54] STABILIZED THERMOSETTING POLYESTER

[75] Inventor: James G. Murray, East Brunswick, N.J.

[73] Assignee: Mobil Oil Corporation, New York, N.Y.

[21] Appl. No.: 221,609

[22] Filed: Dec. 31, 1980

[51] Int. Cl.$^3$ .............................................. C08K 5/36
[52] U.S. Cl. ................................... 523/507; 523/510; 524/333; 524/347
[58] Field of Search ................. 525/445; 260/45.95 C; 585/3

[56] References Cited

U.S. PATENT DOCUMENTS

| | | | |
|---|---|---|---|
| 2,458,494 | 1/1949 | Durland | 585/3 |
| 2,473,801 | 6/1949 | Kropa | 525/445 |
| 2,559,838 | 7/1951 | Anderson | 260/45.95 C |

FOREIGN PATENT DOCUMENTS 540167 10/1941 United Kingdom .

Primary Examiner—V. P. Hoke
Attorney, Agent, or Firm—Charles A. Huggett; Michael G. Gilman; James F. Powers, Jr.

[57] ABSTRACT

This invention provides a formulation comprising a thermosetting polyester, p-methylstyrene, a hydroquinone stabilizer, and 4,4'-thiobis-(3-methyl-6-t-butyl)-phenol.

2 Claims, No Drawings

STABILIZED THERMOSETTING POLYESTER

BACKGROUND OF THE INVENTION

1. Field of the Invention

This invention is directed to stabilized thermosetting polyester formulations.

2. Description of the Prior Art

As is well known in the art, linear thermosetting polyesters have been blended with crosslinking monomers such as styrene and vinyltoluene. When p-methylstyrene was used in place of vinyltoluene, the formulation had a poorer accelerated shelf-life than that containing vinyltoluene. An object of this invention is to provide a formulation containing p-methylstyrene having greater shelf-life without increasing gel time.

SUMMARY OF THE INVENTION

This invention provides a formulation comprising a thermosetting polyester, p-methylstyrene, a hydroquinone stabilizer, and 4,4'-thiobis-(3-methyl-6-t-butyl)-phenol.

DESCRIPTION OF SPECIFIC EMBODIMENTS

The thermosetting polyesters, as is well known in the art, are linear polyesters having ethylenic unsaturation. They are prepared by the condensation reaction of an unsaturated acid, such as maleic anhydride or fumaric acid, with a glycol, such as ethylene glycol, propylene glycol, diethylene glycol, or dipropylene glycol. In order to modify the degree of unsaturation and the reactivity, a saturated dibasic acid can be used, such as phthalic anhydride, isophthalic acid, or adipic acid.

The crosslinking monomer used in the formulation of this invention is p-methylstyrene. It is within the contemplation of this invention to use mixtures of methylstyrene rich in p-methylstyrene. Such mixtures contain at least about 90 weight percent, preferably 95–99 weight percent, p-methylstyrene and less than 0.1 weight percent o-methylstyrene with the balance being m-methylstyrene. A typical mixture contains, by weight, about 95 percent p-methylstyrene, about 5 percent m-methylstyrene, and about 0.05 percent o-methylstyrene. The mixtures are prepared by catalytic dehydrogenation of ethylmethyl benzene isomers described in U.S. Pat. No. 4,086,287 to which reference is made. The amount of p-methylstyrene in the formulation is between about 15 percent and about 40 percent, based upon the total weight of the formulation.

The hydroquinone stabilizers are well known in the art, e.g., hydroquinone and t-butylhydroquinone. They are used in small amounts, generally between about 25 ppm and about 100 ppm.

The co-stabilizer used in accordance with this invention is 4,4'-thiobis-(3-methyl-6-t-butyl) phenol. It is used at concentrations between about 25 ppm and about 300 ppm.

EXAMPLE 1

A thermosetting polyester resin was blended with 30% vinyltoluene (35% para and 65% meta), based upon total blend weight and 100 ppm t-butylhydroquinone. A sample was tested for shelf-life and SPI gel time. Results are set forth in the Table.

EXAMPLE 2

A thermosetting polyester resin was blended with 30% p-methylstyrene (97% para and 3% meta), based upon total blend weight, 100 ppm t-butylhydroquinone, and 200 ppm 4,4'-thiobis-(3-methyl-6-t-butyl) phenol. A sample was tested for shelf-life and SPI gel time. Results are set forth in the Table.

TABLE

|  | Shelf Life | SPI Gel Times | | |
|---|---|---|---|---|
|  | Hrs. | Gel, Min. | Rise, Min. | Exotherm |
| Example 1 | 15 | 9.3 | 1.6 | 356° F. |
| Example 2 | 20 | 9.5 | 1.6 | 356° F. |

Shelf-life is determined in hours at 70° C. in 77 percent full bottles. In the SPI, a sample with benzoyl peroxide catalyst is placed in a test tube and held in a constant temperature bath held at 180° F. (82.2° C.). The time to gel is determined to the nearest 0.1 minute. The time for the exotherm to the maximum temperature and maximum temperature are also determined.

It will be noted that shelf-life in Example 2 was improved, without increasing gel times. Using a blend as in Example 2, but containing only the 100 ppm t-butylhydroquinone stabilizer shelf-life was poorer than with the blend of Example 1 (vinyltoluene). When attempts were made to improve shelf-life of the blend by adding more t-butylhydroquinone stabilizer, only a small increase in shelf-life was noted and increased gel times were noted which would be undesirable in many applications.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A formulation consisting essentially of a thermosetting polyester, p-methylstyrene, a hydroquinone stabilizer, and 4,4'-thiobis-(3-methyl-6-t-butyl)-phenol.

2. The formulation of claim 1, wherein said stabilizer is t-butylhydroquinone.

* * * * *